Figure 1:
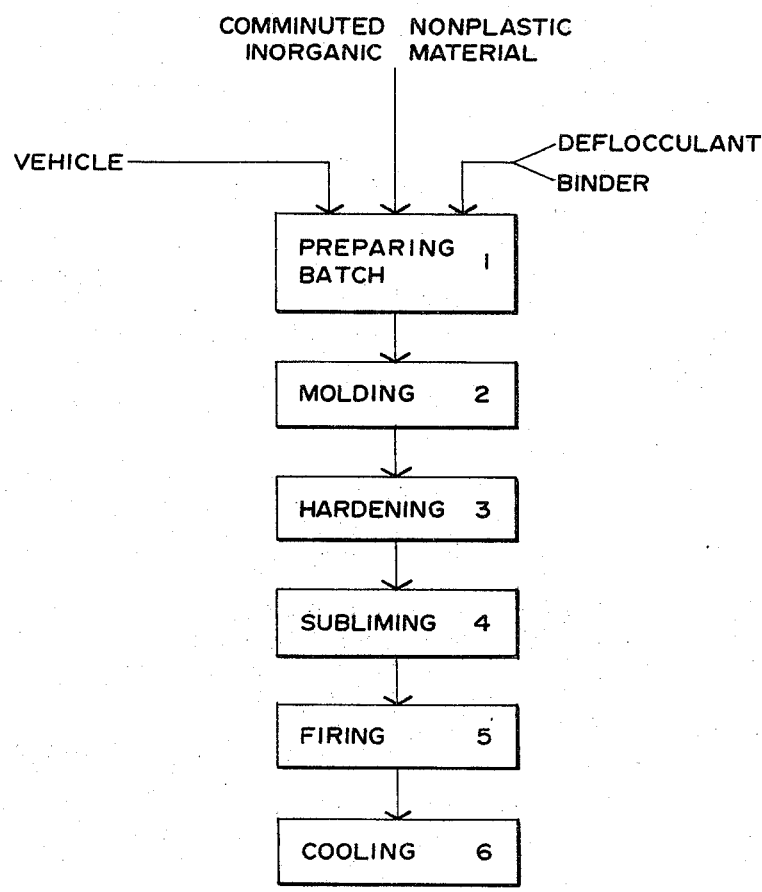

INVENTOR
Eldor R. Herrmann

3,330,892
MOLDING COMMINUTED NONPLASTIC INORGANIC MATERIAL
Eldor R. Herrmann, St. Paul, Minn., assignor to Corning Glass Works, Corning, N.Y., a corporation of New York
Filed July 24, 1964, Ser. No. 391,062
7 Claims. (Cl. 264—63)

This invention relates to the formation of sintered articles having relatively low porosity from comminuted nonplastic inorganic materials, such as powders of ceramics, glass-ceramics, glasses, cermets, metals and mixtures of these materials. Its principal object is to provide a novel process and formulations of moldable batch mixtures for the economical production of such articles in large quantities and capable of being employed by any of the well-known molding techniques, such as pressing, injection, transfer, gravity or slip casting, dip casting, drain casting, extruding, rolling, spraying, spinning, and also by sealing together two or more "green" articles.

This invention more particularly relates to a process comprising the steps of: (1) preparing a novel molding batch mixture wherein comminuted nonplastic inorganic material is mixed with and dispersed in a fluid organic vehicle together with an organic deflocculant (and binder), (2) confining (molding) the fluid batch mixture to the desired shape (in a mold), (3) hardening (solidifying) the shaped mixture to a relatively rigid green body, (4) subliming the vehicle out of the body, (5) firing the green body to sinter and densify it into a strongly coherent article, and to substantially drive off the remaining organic components by oxidation and/or decomposition. As is common in the ceramics art, the term "green" is used throughout this specification to denote that state of the molded body where it has been hardened to a relatively rigid state, but it has not yet been fired to a strongly coherent sintered state.

One unique feature of this invention is the formulation of the molding batch mixture.

The organic vehicle is so chosen: (1) that it is a solid at room temperature and capable of being rendered fluid by heating or melting at relatively low temperature to provide the primary component for suitable fluidity or moldable consistency to the batch mixture for the desired molding technique utilized, (2) that upon confining the fluid batch mixture to the desired shape (in a mold), it can be quickly resolidified by cooling no lower than normal room temperature thereby hardening the shaped mixture to a rigid body, and (3) that it can be readily and relatively quickly removed from the body by sublimation (by virtue of its high solid state vapor pressure) at a temperature from room temperature up to its melting point without causing distortion, sagging or cracking in the body.

The organic deflocculant is an important and essential feature of this invention. It must be substantially soluble in the vehicle and possess the characteristic deflocculating ability of reducing the viscosity, or of thinning of the consistency of the fluid batch mixture according to this invention whereby the amount of comminuted nonplastic inorganic material can be greatly maximized to a degree where the batch mixture would otherwise be too thick, viscous or of an unmoldable consistency if the organic deflocculant was omitted. By virtue of the presence of the organic deflocculant in the batch mixture, enough comminuted nonplastic inorganic material can be "loaded" or mixed into the moldable batch mixture to constitute the major (by weight) component thereof, and the amount of the other components, that are subsequently removed, can be kept low thereby yielding a minimum amount of porosity in the green state and a minimum amount of firing shrinkage. This, of course, ultimately provides sintered bodies with relatively low porosity and final dimensions more closely conforming to the green state dimensions thereby making unnecessary or minimizing costly and time consuming finishing operations.

A small but effective amount of organic binder is included in the batch mixture to provide handling strength to the green bodies, which would otherwise generally be too fragile for commercial production process handling. Any one of a number of well-known organic binders commonly used heretofore in processes of molding comminuted nonplastic inorganic materials can be used. The amount of binder required is quite small and, as a result, it is possible to avoid the difficulties that may occur with larger amounts, namely, time-consuming burn out, higher porosity, cracking and/or distortion. Generally the amount of binder can be kept lower than 2–3 percent by weight of the total batch mixture while providing adequate or handling strength. In one case noted below, the organic deflocculant was found to also function as a suitable binder when added in an amount slightly more than is necessary for deflocculation. Under such circumstances, both the deflocculant and the binder are the same organic material.

Figure 2:
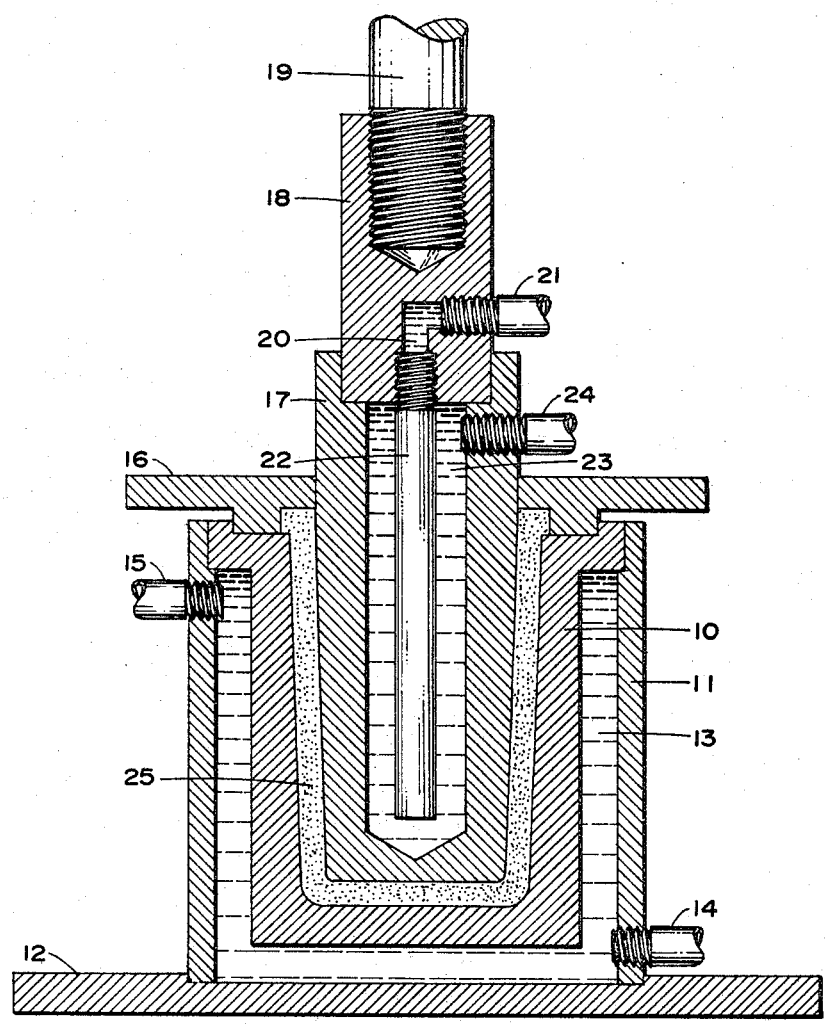

The invention will now be described in greater detail with reference to the accompanying drawings in which:

FIGURE 1 is a flow sheet diagram illustrating the general steps of the process according to this invention, and FIGURE 2 is a cross-sectional view of a water-cooled molding press at the stage of having fully molded a batch mixture into the form of a crucible and utilized to illustrate one molding technique for carrying out the present invention.

Referring to FIGURE 1, step 1 of the process involves preparing the batch mixture. This step basically involves mixing all the components together and heating the resultant batch mixture to render the vehicle fluid. While they may be premixed before melting the vehicle, it is preferred for optimum dispersion and uniformity of mixing to first melt the vehicle, then begin constant stirring of the melted vehicle, next add the deflocculant and then add the comminuted nonplastic inorganic material. The binder can be added at any stage as desired. The maximum "loading" of any comminuted nonplastic inorganic material can be easily determined preliminarily by making up a small test batch mixture by alternately adding the inorganic material and the deflocculant until the batch mixture becomes too thick or viscous for molding consistency, as determined by the difficulty in stirring or by a viscosity meter, and further addition of deflocculant fails to thin out the mixture or render it more fluid again. Thus, the component proportions before the last inorganic material addition give the approximate maximum "loading" of the inorganic material.

It has been found that the rate of stirring, or more specifically the rate of shear in stirring, can have a noticeable effect on maximum "loading" of the inorganic powder material. High rates of shear, such as with high speed propeller mixers, tend to provide lower viscosities than for the same batch mixture stirred at lower rates of shear, e.g., hand-spatula stirring. It appears that the higher shear rates cause more complete breakdown and dispersion of small agglomerates of inorganic powder particles in the mixture. Thus, with high speed-high shear rate mixing, the maximum amount of inorganic material "loading" can be further increased to some degree while still providing moldable consistency.

The choice of nonplastic inorganic material is generally unlimited in the categories of materials mentioned above. While clay materials are of the plastic type of inorganic materials, small amounts that are normally insufficient to provide moldable plasticity to the batch mixture may be added to certain ceramic batches to provide desired properties to the sintered body. The degree of comminution and the particle size distribution of the nonplastic inorganic materials are those commonly used for such molding powders, depending primarily upon the particular inorganic material and the properties desired in the sintered body, as is well known in the art. Generally, for optimum density, the maximum particle size is about 200 Tyler mesh (and preferably less than 325 Tyler mesh), although suitable bodies can be made with maximum particle sizes as large as 20 Tyler mesh for one fraction of the nonplastic inorganic material. Hence, the process of this invention is not critically dependent upon a certain degree of fineness of the inorganic powder so long as it is in the known realm of sizes to produce strong, relatively dense, coherent sintered bodies.

Notably, the process of this invention now makes it possible to press large commercial refractory bricks of dense, fine-grained refractories from finely divided refractory oxides having a particle size of −325 Tyler mesh, which has not been possible with more conventional pressing techniques and heretofore obtainable only with conventional slip casting techniques. Unlike conventional slip casting, where the longer solidification or hardening period allows settling and separation of heavy particles from lighter particles in the batch to produce somewhat nonuniform bodies, the quick hardening or solidification in the present method insures uniform structure and properties throughout the sintered body.

The organic vehicle for the batch mixture formulation of this invention has been determined to be any organic material that is solid at normal room temperatures and pressures, that has a melting point below about 200° C. and that has a vapor pressure of at least 1 mm. of Hg at its melting point under normal ambient atmospheric pressure of substantially one atmosphere. Such organic materials have vapor pressures in the solid state at temperatures below their melting point sufficiently high so as to be readily and quickly sublimed at such temperatures. Some of these organic materials may be undesirable because of cost or toxicity problems, but among those not subject to such objectionable features are the exemplary materials listed in Table I, which were determined to be suitable in the process of this invention.

TABLE I

| Vehicle | Formula | Melting Temp., °C. | Vapor Pressure (mm. Hg) Melting Temp. |
|---|---|---|---|
| Paradichlorobenzene | $C_6H_4Cl_2$ | 53 | 9.0 |
| Chloroacetic acid | $C_2HCl_3O_2$ | 50–63 | 3.9 |
| Naphthalene | $C_{10}H_8$ | 80 | 7.0 |
| Benzoic acid | $C_7H_6O_2$ | 121 | 6.2 |
| Phthalic anhydride | $C_8H_4O_2$ | 131 | 6.8 |
| Camphor | $C_{10}H_{16}O$ | 177–8 | ~350–360 |

Because of the very high vapor pressures of camphor, batch mixtures with this vehicle are best prepared in a closed chamber and molded in a closed system, e.g., in an injection molding apparatus, in order to minimize the loss of camphor from the mixture. In any event, it may be desirable to carry out the subliming step of the process beneath a hood and duct system for safety and/or reclaiming the vapors of the vehicle used.

One important discovery that has made the present invention possible is that certain organic materials are capable of acting as a deflocculant in the batch mixtures having the organic vehicles described above. These materials possess two essential characteristics that have been found to be necessary for functioning as a deflocculant: substantial solubility in the vehicle and being substantially free of water. Other materials not possessing these two characteristics have been found to lack the deflocculating capability in the vehicles according to this invention. It should be noted that any substantial addition of water to the batch mixtures tends to detrimentally thicken the mixture consistency and, therefore, such additions should be avoided. While one particular deflocculant may not work as well with one particular comminuted nonplastic inorganic material as with another comminuted nonplastic inorganic material, an appropriate moldable consistency for any desired combination of comminuted nonplastic inorganic material, molding technique and sintered body characteristics can be readily provided as a result of the variation in degree of deflocculating ability of the various suitable organic deflocculants. Thus, this variation makes it possible to tailor the batch mixture formulation as desired by selection of the deflocculant to meet the needs of any particular molding technique in producing any particular sintered inorganic material body.

The suitable organic defocculants are the following five classes of materials—

(1) Surfactants (surface active agents) that are substantially soluble in the vehicle and substantially water-free: These may be any of the well-known anionic, cationic or nonionic types of these materials commercially produced in a great variety of complex organic formulations. Examples of some that have been found suitable are shown in Table II. These examples were tested in batch mixtures containing paradichlorobenzene, as the vehicle, and the indicated nonplastic inorganic material.

(2) Aliphatic monocarboxylic acids (aliphatic monobasic acids) containing at least three carbon atoms: These include both the saturated and unsaturated acids. Sometimes these acids are referred to as fatty acids. Examples satisfactorily tested in batch mixtures containing paradichlorobenzene and the noted nonplastic inorganic materials are shown in Table III.

(3) Esters of aliphatic monocarboxylic acids containing at least three carbon atoms on each of the acid

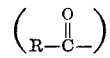

and the alcohol (—O—R) radicals: These include both the saturated and unsaturated esters. Moreover, they include the class of these esters known as lipids, which include fats (glycerides), oils (liquid fats), lecithins and the waxes. Examples satisfactorily tested in batch mixtures containing paradichlorobenzene and the noted nonplastic inorganic materials are shown in Table IV.

(4) Amides of aliphatic monocarboxylic acids containing at least three carbon atoms: These include both the saturated and unsaturated amides. An example of these amides (ammonium stearate or stearamide) satisfactorily tested in a batch mixture containing paradichlorobenzene and alumina is shown in Table V.

(5) Salts of aliphatic monocarboxylic acids containing at least three carbon atoms: These include both the saturated and unsaturated salts. The divalent salts are preferred in conjunction with paradichlorobenzene vehicle because they possess deflocculating ability distinctly superior to that of the monovalent and trivalent salts. Examples of these salts satisfactorily tested in batch mixtures containing paradichlorobenzene and the noted nonplastic inorganic material are shown in Table V.

The identification of the symbolically designated nonplastic inorganic materials in Tables II–V are listed in Table VI.

TABLE II

A. ANIONIC SURFACTANTS

| Trade Name | Chemical Name | Ceramic |
|---|---|---|
| Gafac MC–410 [1] | Free acid of complex phosphate esters | A G P M |
| Gafac Rm–510 | ....do.... | A G |
| Gafac PE–510 [1] | Alkylphenoxypoly (ethylenoxy) ethyl ester of phosphoric acid. | A |
| Gafac GB–520 | Sodium salt of alkyl phosphate ester | A G |

B. CATIONIC SURFACTANTS

| | | |
|---|---|---|
| Arquad 12-50 | Dodecyl trimethyl ammonium chloride. | A |
| Arquad C-50 | ___do___ | AGPM |
| Emcol E-607 | Lauroyl colamino form 1-methyl pyridinium chloride. | A |
| Adogen 442 | Dimethyl dihydrogenated tallow ammonium chloride. | AG |

C. NONIONIC SURFACTANTS

| | | |
|---|---|---|
| Triton X-100 | Alkyl phenoxy polyethoxy ethanol | AG |
| Igepal CA-210 | Alkyl phenoxy polyoxyethylene ethanol. | A |
| Igepal CA-720 | ___do___ | A |
| Tween 40 | Polyoxyethylene (20) sorbitan monopalmitate. | A |
| Tergitol NPX | Nonyl phenyl polyethylene glycol ether cont. 10.5 moles ethylene oxide. | A |
| Tergitol NP-27 | Nonyl phenyl polyethylene glycol ether cont. 7 moles ethylene oxide. | AG |
| Sterox SK | Polyoxyethylene thioethers | A |

[1] Superior deflocculant.

B. UNSATURATED

| | | |
|---|---|---|
| Sodium oleate | $NaC_{18}H_{33}O_2$ | G |
| Zinc oleate | $Zn(C_{18}H_{33}O_2)_2$ | A |
| Zinc linoleate | $Zn(C_{18}H_{31}O_2)_2$ | A |
| Zinc ricinoleate | $Zn(C_{18}H_{33}O_3)_2$ | A |

[1] Superior deflocculant.

TABLE VI

| Symbol | Nonplastic Inorganic Material |
|---|---|
| A | Alumina, particle size 1–40 microns (ave. 6 microns). |
| C | Copper (electrolytic), particle size −325 Tyler mesh. |
| G | Borosilicate glass, particle size 0.5–55 microns (ave. 17 microns), composed of (by weight) 79.2% $SiO_2$, 18.4% $V_2O_3$, 2.4% $K_2O$. |
| M | Calcined magnesite, particle size 1–70 microns (ave. 16 microns). |
| N | Nickel (carbonyl), particle size ave. 3–5 microns. |
| P | High alumina porcelain, particle size 1–14 microns (ave. 5 microns), composed of (by weight) 91.61% $Al_2O_3$, 3.57% $CaCO_3$, 4.82% $SiO_2$. |

TABLE III

A. SATURATED

| Acids | Formula | Ceramic |
|---|---|---|
| Propanoic (propionic) | $CH_3CH_2CO_2H$ | A |
| Butanoic (butyric) | $CH_3(CH_2)_2CO_2H$ | A |
| Pentanoic (valeric) | $CH_3(CH_2)_3CO_2H$ | A |
| Hexanoic (caproic) | $CH_3(CH_2)_4CO_2H$ | A |
| Decanoic (capric) | $CH_3(CH_2)_8CO_2H$ | A |
| Dodecanoic (lauric) | $CH_3(CH_2)_{10}CO_2H$ | A |
| Tetradecanoic (myristic) | $CH_3(CH_2)_{12}CO_2H$ | A |
| Hexadecanoic (palmitic) | $CH_3(CH_2)_{14}CO_2H$ | A |
| Octadecanoic (stearic) | $CH_3(CH_2)_{16}CO_2H$ | AM |

B. UNSATURATED

| | | |
|---|---|---|
| 9-octadecenoic (oleic) | $C_8H_{17}CH:CH(CH_2)_7CO_2H$ | AGMCN |
| 9,12-octadecadienoic (linoleic) | $CH_3(CH_2)_4CH:CHCH_2CH:CH(CH_2)_7CO_2H$ | A |
| 12-hydroxy-9-octadecenoic (ricinoleic) | $CH_3(CH_2)_5CH(OH)CH_2CH:CH(CH_2)_7CO_2H$ | A |

TABLE IV

| Ester | Ceramic |
|---|---|
| Boiled linseed oil [1] | AGM |
| Raw linseed oil | A |
| Corn oil | AG |
| Safflower oil | A |
| Cottonseed oil | AG |
| Soy bean oil | M |
| Peanut oil | M |
| Castor oil | A |
| Fish oil | AG |
| Oil of cloves | A |
| Lard | M |
| Carnauba wax | AGM |
| Petrolite C-15 wax | A |
| Petrolite C-36 wax | A |
| Lecithin | AG |
| Polyvinyl stearate | AG |
| Diglycol stearate [1] | AM |
| Glycol laurate | A |
| Methyl stearate | AM |
| n-Butyl stearate | A |
| n-Butyl oleate | A |

[1] Superior deflocculant.

TABLE V

A. SATURATED

| Amide or Salt | Formula | Ceramic |
|---|---|---|
| Ammonium stearate (stearamide) | $H_2NC_{18}H_{35}O$ | A |
| Sodium stearate | $NaC_{18}H_{35}O_2$ | AG |
| Lithium stearate | $LiC_{18}H_{35}O_2$ | A |
| Magnesium stearate | $Mg(C_{18}H_{35}O_2)_2$ | AG |
| Calcium stearate | $Ca(C_{18}H_{35}O_2)_2$ | AG |
| Iron stearate [1] | $Fe(C_{18}H_{35}O_2)_2$ | A |
| Zinc stearate [1] | $Zn(C_{18}H_{35}O_2)_2$ | AGPM |
| Cadmium stearate [1] | $Cd(C_{18}H_{35}O_2)_2$ | A |
| Barium stearate | $Ba(C_{18}H_{35}O_2)_2$ | A |
| Lead stearate [1] | $Pb(C_{18}H_{35}O_2)_2$ | A |
| Zinc caprylate | $Zn(C_8H_{15}O_2)_2$ | A |
| Zinc laurate | $Zn(C_{12}H_{23}O_2)_2$ | A |
| Zinc palmitate [1] | $Zn(C_{16}H_{31}O_2)_2$ | A |
| Aluminum stearate | $Al(C_{18}H_{35}O_2)_3$ | AG |

Due to the complexity of phosphorus chemistry, it is reportedly not possible to define the Gafac surfactants by specific names or exact formulas. They are of the general type $R-OPO_3H_2$ and $(R-O)_2PO_2H$ where R represents an alkyl radical or an alkylaryl radical which has been modified by the addition of alkylene oxides. A more detailed type formula is as follows:

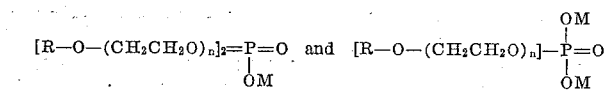

wherein R can be an alkyl radical or an alkylphenyl radical, each ranging from $C_8$ to $C_{20}$ or higher, the number of moles (n) of ethylene oxide can vary over a wide range and M can be H, $NH_4$, Na or other metal.

The waxes, Petrolite C-15 and Petrolite C-36, are oxidized microcrystalline waxes produced by oxidation of regular high molecular weight microcrystalline waxes; this oxidation forms esters of fatty acids and fatty acid in the wax which imparts saponifiability. As is known, microcrystalline waxes are complex mixtures of largely naphthenes and isoparaffins with a small amount of paraffins, and the whole-waxes usually have average molecular weights in the range from 580 to 700. These waxes are separated from high-molecular-weight residual petroleum stocks that have not been volatilized by distillation. The amount of fatty acids and esters in the oxidized waxes are normally expressed as an acid number and saponification number, which are as follows for these two particular waxes:

| Wax | Acid No. | Saponification No. |
|---|---|---|
| Petrolite C-15 | 15/17 | 45/55 |
| Petrolite C-36 | 30/35 | 75/85 |

The corresponding numbers for unoxidized microcrystalline wax are "nil."

As noted above, the organic binder can be any one of the materials commonly used for this function. Examples of such materials are: carnauba wax, polymethyl methacrylate resin, polyethylene glycols with average molecular weight ranging from 3000 to 20,000, polyvinyl acetate resin, unoxidized and oxidized microcrystalline waxes, styrene resins with average molecular weights of 1500 or more, chlorinated naphthalene and polyvinyl alcohol resin.

Again referring to FIGURE 1, after an appropriate moldable batch mixture has been prepared, the molding step 2 is accomplished by subjecting the mixture to the desired molding technique followed by the hardening or cooling step 3 to rigidify the mixture in the shape desired. These two steps can be illustrated by reference to FIGURE 2. The latter figure shows a simple mold press comprising a meal mold 10 supported within a housing consisting of cylindrical shell 11 and base 12. The mold 10, shell 11 and base 12 are fastened together to form a watertight chamber 13. Shell 11 is provided with a water inlet 14 near the base 12 and a water outlet 15 near the upper portion of shell 11. By this means, water can be circulated through chamber 13 to cool mold 10 and thereby cause the cooling and hardening of the molded mixture 25 to the required shape as a result of the solidification of the vehicle in the mixture.

A mold cover 16 is provided on top of mold 10 to assist in forming the upper portions of the shaped mixture 25. Cover 16 is provided with a central opening into which a hollow tapered plunger 17 can descend and so designed that when plunger 17 reaches its proper lowermost position during the molding step 2, there is no substantial space between the central opening wall on cover 16 and the plunger 17 so as to prevent the mixture 25 from oozing out of the molding chamber. Plunger 17 is rigidly attached in a watertight manner to coupling member 18 to form a chamber 22 for cooling water. Member 18 is attached to shaft 19, which in turn is operatively connected to an air cylinder (not shown) for raising and lowering the combination assembly of plunger 17, member 18 and shaft 19. Member 18 is provided with a water passage 20 connecting a water inlet 21 and a pipe 22, the latter extending down into chamber 23 to provide adequate water circulation therein. Plunger 17 is provided with a water outlet 24 near its upper portion that remains above cover 16 during the pressing stage.

In operation, the plunger 17 is initially in a raised position above the mold 10 and cover 16 is put in place. Tap water is caused to flow through inlet 14, chamber 13, outlet 15 and through inlet 21, passage 20, pipe 22, chamber 23, outlet 24. An appropriately measured quantity of moldable batch mixture 25, containing the vehicle in melted condition, is poured into the lower part of the cavity of the mold 10 and immediately thereafter the plunger 17 is brought down to its lowermost position (as shown in FIGURE 2), forcing the moldable batch mixture 25 to fill the upper part of the cavity formed by the mold 10, plunger 17 and an apertured cover 16 on top of the mold 10, the aperture or central opening of which accommodates the plunger 17 in its lowermost position. The plunger 17 is held in this position for a short time of a minute or more (depending upon the thickness of the molded mixture 25) until the vehicle in the mixture 25 solidified to rigidify the molded body. Then the plunger 17 is raised, the cover 16 is removed and the molded mixture (green body) 25 is lifted out of the mold.

The above procedure tends to form minor chill wrinkles on the outer surface of the green body at the level of the initial poured fill of batch mixture in the lower part of the mold. When this chill wrinkle is objectionable, it can be eliminated by initially heating the mold 10 to a temperature near the melting point of the vehicle, pressing and then cooling the mold members to solidify the mixture 25. With paradichlorobenzene used as the vehicle, hot water at about 40° C. can be circulated through chamber 13 for suitable heating of the mold.

When both the plunger 17 and the mold 10 are water-cooled with tap water during pressing, the mixture 25 solidifies from both surfaces toward the center. With a vehicle, such as paradichlorobenzene, having high volume shrinkage during solidification, a parting line or zone of weakness tends to develop in the central portion of the green body wall which is deficient in vehicle. If this objectionably lowers handling strength, this parting line can be eliminated by cooling from one surface while the other surface is initially held above the melting point of the vehicle and then slowly cooling this other surface. Generally, this parting line in the green body (because of vehicle deficiency) has no substantial adverse effect on the sintered body.

Normally, when the mold 10 and plunger 17 are cooled with tap water throughout the molding and hardening steps, the molded mixture 25 shrinks free of the mold members thereby facilitating easy removal. However, when the mold is heated during forming to 40° C. to eliminate chill wrinkles in a paradichlorobenzene-containing mixture and then cooled to solidify the mixture, the mold shrinks along with the molded mixture and sticking difficulty is experienced in removing the green body. This problem can be avoided by maintaining tap water cooling of the mold 10, but locally heating its inside surface prior to pouring the mixture. This procedure eliminates the chill wrinkles and sticking in the mold. Notably, naphthalene-containing mixtures normally shrink free of the mold even when the mold temperature is 70° C. during forming.

As an alternative, or supplementary, solution to the sticking problem, suitable mold release agents can be applied to the molding surfaces of the mold members. Good results have been obtained with a 1:5 (by volume) mixture of oleic acid and kerosene, and with glycerine mixed with a 10% (by volume) water solution containing 10% Aerosol OT in order to prevent the glycerine from "beading up" on the molding surfaces.

After removal of the green body from the mold, it is then subjected to the subliming or "drying" step 4. This is accomplished either by allowing normal sublimation or "evaporation" of the vehicle to occur in open air at room temperature or, for more rapid processing, by heating the green body to a temperature below the melting point of the vehicle so as to avoid melting the organic components, which would otherwise tend to cause sagging and/or distortion of the green body. The time required for susbtantially complete sublimation removal of the vehicle varies with the thickness of the green body. Generally, with heating at about 10° C. below the melting point of the vehicle and good air circulation around the green body, the time for satisfactory removal of the vehicle can be as low as about 4 hour for $\frac{1}{16}''$ thickness and about 72 hours for $\frac{1}{2}''$ thickness. Further decrease in "drying" time may be obtained with forced air circulation or reduced ambient pressure in the "drying" chamber or oven.

Upon completion of the sublimation step 4, the green body is then subjected to the firing step 5 and subsequently the cooling step 6. The firing and cooling schedules of temperature and time are those commonly known or suitably appropriate for the particular comminuted nonplastic inorganic material employed in the process.

The invention will now be illustrated by the following series of examples.

*Example 1*

A porcelain molding batch was prepared by melting the vehicle and then adding in the other components by

Example 12

A copper metal powder batch suitable for processing to the sublimed condition as above consists of:

| | | |
|---|---|---|
| Copper (electrolytic), −325 Tyler mesh | gm. | 343 |
| Paradichlorobenzene | gm. | 73 |
| Oleic acid | cc. | 6 |
| Petrolite C-36 | gm. | 5 |

This batch can be satisfactorily fired at 900° C. for 15–30 minutes in hydrogen atmosphere.

Example 13

A nickel metal powder batch suitable for processing to the sublimed condition as above consists of the same batch as in Example 12 except for 347 gm. nickel (carbonyl), average 3–5 microns, substituted for the copper. This batch can be satisfactorily fired at 1100° C. for 1 hour in hydrogen.

Example 14

The following batch, comprising 63.2% by volume of glass plus alumina, was prepared by the usual method above:

| | | |
|---|---|---|
| Alumina, 1–40μ (ave. 6μ) | gm. | 426 |
| Borosilicate glass, 0.5–55μ (ave. 17μ) (composed of, by weight, 80% $SiO_2$, 12.2% $B_2O_3$, 4% $Na_2O$, 2.6% $Al_2O_3$, 0.4% $K_2O$, 0.8% CaO) | gm. | 191 |
| 96+% silica glass, 0.5–55μ (ave. 17μ) | gm. | 194 |
| Naphthalene | gm. | 164 |
| Zinc stearate | gm. | 9.7 |
| Carbowax 20M | gm. | 14.6 |

The batch was allowed to solidify. Chunks of the solid mixture were placed in an injection cylinder of an injection molding apparatus, melted and injected into the die cavity having the form of an elbow pipe fitting. The molded batch was solidified in the die cavity by cooling the die. After removal of the green fitting from the die, the naphthalene was sublimed off at 70° C. and the green fitting fired to an impervious condition at 1360° C. for one hour with 10% linear firing shrinkage.

Example 15

The following batch was prepared as in Example 1:

| | | |
|---|---|---|
| Alumina, 1–40μ (ave. 6μ) | gm. | 498 |
| Paradichlorobenzene | gm. | 182 |
| Zinch stearate | gm. | 7.5 |
| Carbowax 20M | gm. | 10 |

The water-cooled plunger 17 was positioned in the water-cooled mold 10 with the cover 16 removed. The mixture was cast into the crucible-shaped cavity and allowed to solidify. The plunger was retracted and the green crucible was lifted out. Satisfactory "drying" and firing was performed as in Example 2.

Example 16

A water-cooled plunger was dipped into a batch mixture of Example 15 and held until a ¼" thickness of the mixture had solidified on the plunger surface. Then the plunger was retracted and the resultant green crucible was removed from the plunger. "Drying" and firing was as in Example 2.

Example 17

A batch mixture of Example 15 was poured into the mold 10 without using plunger 17 and cover 16. The mold cavity was completely filled and after a ¼" thickness of mixture had solidified on the mold surface, the remainder of the fluid mixture was poured out of the mold. The resultant green crucible was lifted out, and "dried" and fired as in Example 2.

Example 18

A batch mixture of Example 15 was poured into the barrel of an extrusion machine and allowed to solidify. The barrel was positioned in the machine and the contained mixture remelted with strip heaters. Then the remelted mixture was extruded at 1000–1500 p.s.i., solidifying as it passed through the extrusion die and into the air in the form of ¾" diameter tubing with a ¹⁄₁₆" thick wall. The paradichlorobenzene was sublimed at 40° C. while the tubing was supported on V-shaped supports. Firing was done at 1700° C. for one hour while the tubing was supported in a bed of alumina powder.

Example 19

The following batch was prepared as in Example 1:

| | | |
|---|---|---|
| Alumina, 1–40μ (ave. 6μ) | gm. | 598 |
| Paradichlorobenzene | gm. | 146 |
| Zinc stearate | gm. | 9 |
| Carbowax 20M | gm. | 12 |

The moldable batch mixture was poured onto a sheet of aluminum foil. A second sheet of foil was placed on top of the mixture, which was still fluid or moldable, and then a roller exerting downward pressure was rolled over the top foil. After solidification, the foils were stripped from the green rolled sheet, and the sheet was set on a flat mullite plate and "dried" at 40° C. followed by firing at 1700° C. for one hour.

Example 20

The following batch was prepared as in Example 1:

| | | |
|---|---|---|
| Alumina, 1–40μ (ave. 6μ) | gm. | 397 |
| Paradichlorobenzene | gm. | 219 |
| Zinc stearate | gm. | 6 |
| Carbowax 20M | gm. | 8 |

The fluid batch mixture was poured into the jar of a spray gun. The jar and nozzle were kept heated by a hot air blower sufficiently to prevent solidification. The mixture was sprayed onto a sheet of aluminum foil, where it immediately solidified, to form a ¹⁄₆₄" green sheet. After stripping the foil, the green sheet was set on a mullite plate; then it was "dried" at 40° C. and subsequently fired at 1700° C. for one hour.

Example 21

The following batch was prepared as in Example 1:

| | | |
|---|---|---|
| Fused silica, −200 Tyler mesh | gm. | 2044 |
| Paradichlorobenzene | gm. | 770 |
| Zinc stearate | gm. | 11 |

The fluid batch mixture was poured into a centrifugal casting mold having the shape of a radome. The mold was spun at 500 r.p.m. When the mixture had solidified, the green radome was lifted out and "dried" at 49° C. Firing was done at 1200° C. for one hour.

Example 22

A batch mixture of Example 15 was prepared and cast into molds to form two solidified bars. Before "drying," the bars were butted together and sealed with a soldering gun by the technique similar to welding of metal without filler rod. Further processing was the same as in Example 15.

I claim:
1. The process of making sintered articles from comminuted nonplastic inorganic material comprising the steps of:
    (A) preparing a molding batch mixture consisting of
        (1) comminuted nonplastic inorganic material as a major component by weight thereof,
        (2) a melted organic vehicle that is solid at normal room temperature and pressure, said vehicle having a melting point below about 200° C. and having a vapor pressure of at least about 1 mm. of Hg at the melting point of said vehicle under ambient atmosphere pressure of substantially one atmosphere, and
        (3) an organic deflocculant substantially soluble in said melted vehicle and substantially free of water selected from the group consisting of high speed stirring, while heating in the range of 65–75° C., of the following mixture:

High alumina porcelain, 1–14μ (ave. 5μ) (composed of, by weight, 91.61% Al$_2$O$_3$, 3.57% CaCO$_3$, 4.82% SiO$_2$) _____ gm__ 600
Paradichlorobenzene _____ gm__ 146
Gafac MC–410 _____ ml__ 8
Carbowax 20M _____ gm__ 12

The Carbowax 20M binder is a polyethylene glycol having an average molecular weight of 15,000–20,000 and formed by molecularly joining polyethylene glycol of approximate average molecular weight of 6000 with a diepoxide. The porcelain ceramic comprised 57.3% by volume of the batch mixture. A measured quantity of the mixture was poured into the tap-water-cooled steel cruciblem mold shown in FIGURE 2, and the plunger was pressed down and held for about a minute. After retracting the plunger, the well-molded green crucible was lifted from the mold, "dried" at 40° C. until substantially all the paradichlorobenzene had been sublimed, and then fired at 1625° C. for two hours, resulting in an impervious, strongly coherent sintered crucible.

*Example 2*

An alumina molding batch, processed to the sublimed condition as in the previous example, consisted of:

Alumina, 1–40μ (ave. 6μ) _____ gm__ 717
Paradichlorobenzene _____ gm__ 175
Gafac MC–410 _____ ml__ 9
Mobilwax 2305 _____ gm__ 14.3

The Mobilwax 2305 binder is an unoxidized microcrystalline wax. The alumina ceramic comprised 55.8% by volume of the batch mixture. After firing at 1700° C. for one hour, the sintered, strongly coherent crucible had undergone only 8.7% linear shrinkage.

*Example 3*

This batch was the same as in Example 2 except that 14.3 gm. of carnauba wax was substituted as the deflocculant and the binder. The alumina comprised 57.2% by volume of the batch. Satisfactory firing was accomplished at 1700° C. for two hours with 9.2% linear shrinkage.

*Example 4*

A magnesia batch, processed to the sublimed condition as above, consisted of:

Calcined magnesite, 1–70μ (ave. 16μ) _____ gm__ 698
Paradichlorobenzene _____ gm__ 153
Gafac MC–410 _____ ml__ 3.5
Mobilwax Cerese _____ gm__ 14.0

The Mobilwax Cerese binder is an unoxidized microcrystalline wax. The magnesite comprised 61.5% by volume of the batch. A well sintered crucible was obtained by firing at 1700° C. for two hours with a linear firing shrinkage of 9.7%.

*Example 5*

An alumina batch, processed to the sublimed condition as above, consisted of:

Alumina, 1–40μ (ave. 6μ) _____ gm__ 700
Naphthalene _____ gm__ 133
Gafac MC–410 _____ ml__ 9
Carbowax 20M _____ gm__ 14

The alumina comprised 56.4% by volume of the batch. Firing at 1700° C. for two hours yielded a well sintered crucible with 9.7% linear firing shrinkage.

*Example 6*

A borosilicate glass batch, processed to the sublimed condition as above, consisted of:

Borosilicate glass, 0.5–55μ (ave. 17μ) (composed of, by weight, 79.2% SiO$_2$, 18.4% B$_2$O$_3$, 2.4% K$_2$O) _____ gm__ 453
Paradichlorobenzene _____ gm__ 131
Zinc stearate _____ gm__ 4.5
Petrolite C–15 wax _____ gm__ 9.0

The glass powder comprised 67.1% by volume of the batch. The crucible was fired to an impervious condition at 800° C. For 10 minutes with 11.3% linear firing shrinkage.

*Example 7*

A well-molded and satisfactory sintered crucible was obtained from an alumina batch, processed as in Example 2, consisted of:

Alumina, 1–40μ (ave. 6μ) _____ gm__ 159
Paradichlorobenzene _____ gm__ 72.6
Zinc stearate _____ gm__ 3.2

Because of the omission of a binder, it was necessary to handle the fragile green body with greater care.

*Example 8*

Another batch suitable for processing to the sublimed condition as in Example 1 consists of:

| | Volume percent |
|---|---|
| Fused silica, −20+50 Tyler mesh | 43.7 |
| 96+% silica glass, −325 Tyler mesh (composed of, by weight, 96.5% SiO$_2$, 3% B$_2$O$_3$, 0.5% Al$_2$O$_3$) | 38.3 |
| Paradichlorobenzene | 15.7 |
| Zinc stearate | 2.3 |

This batch can be satisfactorily fired at 1250° C. for one hour. Due to the omission of a binder, the fragile green body requires careful handling.

*Example 9*

Another alumina batch suitable for processing according to Example 2 consists of:

| | Volume percent |
|---|---|
| Alumina, −325 Tyler mesh | 51.5 |
| Paradichlorobenzene | 41.5 |
| Calcium stearate | 4.5 |
| Polyvinyl alcohol | 2.5 |

*Example 10*

A zircon-glass batch suitable for processing to the sublimed condition as above consists of:

Zircon, −325 Tyler mesh _____ gm__ 705
96+% silica glass, −325 Tyler mesh _____ gm__ 985
Paradichlorobenzene _____ gm__ 233
Zinc stearate _____ gm__ 22

This batch can be satisfactorily fired at 1460° C. for one hour. Again, careful handling of the green body is required because of the omission of a binder.

*Example 11*

A beta spodumene-petalite batch that can be processed to the sublimed condition as above consists of:

Calcined spodumene, −325 Tyler mesh _____ gm__ 214
Petalite, −325 Tyler mesh _____ gm__ 556
Grog, −10 Tyler mesh (composed of crushed, sintered mixture of calcined spodumene and petalite in the above proportions) _____ gm__ 85.6
Paradichlorobenzene _____ gm__ 214
Zinc stearate _____ gm__ 11.1
Carbowax 20M _____ gm__ 8.6

This batch can be satisfactorily fired at 1350° C. for four hours.

(a) surfactants having substantial solubility in said vehicle and being substantially free of water,
(b) aliphatic monocarboxylic acids containing at least three carbon atoms,
(c) esters of aliphatic monocarboxylic acids containing at least three carbon atoms on each of the acid and the alcohol radicals,
(d) amides of aliphatic monocarboxylic acids containing at least three carbon atoms, and
(e) salts of aliphatic monocarboxylic acids containing at least three carbon atoms, (B) molding said mixture while said vehicle remains melted to desired shape, (C) cooling said molding mixture to solidify said vehicle and harden the mixture into a rigidified green body, (D) subliming said vehicle from said green body, and (E) firing said green body to sinter the nonplastic inorganic material into a coherent body.

2. The process of claim 1 wherein a small but effective amount of organic binder is added to said batch mixture to subsequently provide greater handling strength in said green body.

3. The process of claim 2 wherein said organic binder is present in an effective amount less than 3% by weight of the total batch mixture.

4. The process of claim 1 wherein said vehicle is paradichlorobenzene.

5. The process of claim 1 wherein said vehicle is naphthalene.

6. The process of claim 1 wherein said nonplastic inorganic material is selected from the group consisting of ceramics, glass-ceramics, glasses, cermets, metals, metallic alloys and mixtures thereof.

7. The process of claim 4 wherein said organic defloculant is zinc stearate.

References Cited

UNITED STATES PATENTS 2,446,872   8/1948   Ehlers.
3,234,308   2/1966   Herrmann _____ 264—63

FOREIGN PATENTS 489,981   8/1938   Great Britain.

ROBERT F. WHITE, *Primary Examiner.*

R. B. MOFFITT, *Assistant Examiner.*

UNITED STATES PATENT OFFICE
CERTIFICATE OF CORRECTION

Patent No. 3,330,892                 July 11, 1967

Eldor R. Herrmann

It is hereby certified that error appears in the above numbered patent requiring correction and that the said Letters Patent should read as corrected below.

Column 2, line 19, before "or" insert -- green --; column 4, after line 75, insert the following:

| | | |
|---|---|---|
| Gafac RS-610* | Free acid of complex phosphate esters | A |
| Gafac RE-610 | Alkylphenoxypoly (ethylenoxy) ethyl ester of phosphoric acid | A |
| Aerosol OT | Sodium dioctyl sulfosuccinate | AG |
| Aerosol TR | Sodium bis(tridecyl) sulfosuccinate | AG |
| Aerosol OS | Sodium isopropylnaphthalene sulfonate | A |
| Nacconol NR | Alkyl benzene sodium sulfonate | AG |
| Sorapon SF-78 | Sodium dodecylbenzene sulfonate | AG |
| Emcol PIO-59 | Amine salt of dodecylbenzene sulfonic acid | AG |
| Triton 770 conc. | Sodium salt of isooctyl phenoxy diethoxyethyl sulfate | AG |

Signed and sealed this 25th day of June 1968.

(SEAL)
Attest:

EDWARD M. FLETCHER, JR.
Attesting Officer

EDWARD J. BRENNER
                Commissioner of Patents